United States Patent
Tan et al.

(10) Patent No.: US 10,901,107 B2
(45) Date of Patent: Jan. 26, 2021

(54) CALIBRATION METHOD FOR ELECTROMAGNETIC INDUCTION MEASUREMENT SYSTEMS, AND APPARATUS

(71) Applicant: FORSCHUNGSZENTRUM JUELICH GmbH, Juelich (DE)

(72) Inventors: Xihe Tan, Juelich (DE); Achim Mester, Merzenich (DE); Egon Zimmermann, Inden/ Altdorf (DE); Jan Van Der Kruk, LR Vaals (NL)

(73) Assignee: FORSCHUNGSZENTRUM JUELICH GMBH, Juelich (DE)

( * ) Notice: Subject to any disclaimer, the term of this patent is extended or adjusted under 35 U.S.C. 154(b) by 43 days.

(21) Appl. No.: 16/310,463

(22) PCT Filed: Jun. 14, 2017

(86) PCT No.: PCT/DE2017/000171
§ 371 (c)(1),
(2) Date: Dec. 17, 2018

(87) PCT Pub. No.: WO2018/014891
PCT Pub. Date: Jan. 25, 2018

(65) Prior Publication Data
US 2019/0265379 A1 Aug. 29, 2019

(30) Foreign Application Priority Data

Jul. 19, 2016 (DE) .................. 10 2016 008 841

(51) Int. Cl.
*G01V 3/10* (2006.01)
*G01V 13/00* (2006.01)
*G01V 3/15* (2006.01)

(52) U.S. Cl.
CPC ............... *G01V 3/104* (2013.01); *G01V 3/15* (2013.01); *G01V 13/00* (2013.01)

(58) Field of Classification Search
CPC ........... G01V 3/104; G01V 3/15; G01V 13/00
See application file for complete search history.

(56) References Cited

U.S. PATENT DOCUMENTS 4,258,322 A * 3/1981 Rocroi ................ G01V 3/108
324/335
6,710,599 B2  3/2004 Bosnar
(Continued)

FOREIGN PATENT DOCUMENTS

| CA | 2424250 C | 5/2006 |
| WO | WO 2008137987 A1 | 11/2008 |
| WO | WO 2014056069 A1 | 4/2014 |

OTHER PUBLICATIONS

Burke J. Minsley et al: "Multielevation calibration of frequency-domain electromagnetic data", Geophysics, vol. 79, No. 5, Aug. 5, 2014 (Aug. 5, 2014), pp. E201-E2016, XP055276096.
(Continued)

*Primary Examiner* — Dominic E Hawkins
(74) *Attorney, Agent, or Firm* — Leydig, Voit & Mayer, Ltd.

(57) ABSTRACT

A method for calibration of electromagnetic induction measurement systems. The method includes transmitting, by at least one transmitter of an electric induction measurement system, a magnetic field as a primary signal, wherein the transmitting the magnetic field as the primary signal triggers a current in the soil which current generates a secondary signal, and recording, by a receiver of the electric induction measurement system, the secondary signal at each of at least two heights of the receiver relative to a soil to be measured in order to create an input vector that is a combination of soil properties and environmental properties that contain the (Continued)

properties of the electric induction measurement system, that contains a dataset of n conductivity values of n layers, and that creates, as a starting value, an initial value vector. The initial value vector includes assumptions and apparent electrical conductivities for m measurement heights.

13 Claims, 2 Drawing Sheets

(56) References Cited

U.S. PATENT DOCUMENTS

| | | | |
|---|---|---|---|
| 7,759,941 | B2 | 7/2010 | Bosnar |
| 2003/0184301 | A1 | 10/2003 | Bosnar |
| 2005/0104595 | A1* | 5/2005 | Nelson .................. G01V 13/00 324/327 |
| 2007/0061080 | A1* | 3/2007 | Zhdanov .................. G01V 3/12 702/7 |
| 2015/0177412 | A1 | 6/2015 | San Martin et al. |
| 2015/0219781 | A1* | 8/2015 | Wahrlich ................. G01V 3/02 702/65 |
| 2017/0074905 | A1* | 3/2017 | Louzir .................. G01R 19/15 |

OTHER PUBLICATIONS

Sasaki Y et al: "Resistivity and offset error estimations for the small-loop electromagnetic method", Geophysics, Society of Exploration Geophysicists, vol. 73, No. 3, May 1, 2008 (May 1, 2008), pp. F91-F95, XP001512277.

J M H Hendrickx et al: "Inversion of Soil Conductivity Profiles from Electromagnetic Induction Measurements: Theory and Experimental Verification", Soil Sci. Soc. Am. J., Jan. 1, 2002 (Jan. 1, 2002), pp. 673-685, XP055407946.

Michael Killick: "An analysis of the relationship of apparent electrical conductivity to soil moisture in alluvial Recent Soils, lower North Island, New Zealand (thesis)", Apr. 1, 2013 (Apr. 1, 2013), pp. FP-31, 68-95, XP055407859.

R Gebbers et al: "Depth sounding with the EM38-detection of soil layering by inversion of apparent electrical conductivity measurements", $6^{th}$ European Conference on Preicsion Agriculture, Skiathos, Greece, Jun. 3-6, 2007 (Jun. 3, 2007), pp. 1-9, XP055407906.

McNeill, J.D., "Technical Note TN-6 Electromagnetic terrain conductivity measurement at low induction numbers", Oct. 1980, pp. 5-15.

Stanley H. Ward, "Electromagnetic Theory for Geophysical Applications", Electromagnetic Methods in Applied Geophysics-Theory, vol. 1, Dec. 1987, chapter 4, pp. 131-311.

F. Lavoué, et al., "Electromagnetic induction calibration using apparent electrical conductivity modelling based on electrical resistivity tomography", Near Surface Geophysics, vol. 8, Dec. 2010, pp. 553-561.

\* cited by examiner

CALIBRATION METHOD FOR ELECTROMAGNETIC INDUCTION MEASUREMENT SYSTEMS, AND APPARATUS

CROSS REFERENCE TO RELATED APPLICATIONS

This application is a U.S. National Stage Application under 35 U.S.C. § 371 of International Application No. PCT/DE2017/000171 filed on Jun. 14, 2017, and claims benefit to German Patent Application No. DE 10 2016 008 841.9 filed on Jul. 19, 2016. The International Application was published in German on Jan. 25, 2018, as WO 2018/014891 A1 under PCT Article 21(2).

FIELD

The invention relates to a calibration method for electromagnetic induction measurement systems (EMI systems), which can be used, for example, for measuring the apparent electrical conductivity of soils. The invention further relates to an apparatus suitable for performing such a calibration method.

BACKGROUND

Electromagnetic induction methods are suitable for contactless measurement of electrical conductivity. In the field of geophysics, instruments which are based on this measurement principle have been used for more than 30 years for characterizing soils. The class of instruments which are specifically designed for examining near-surface soil up to a depth of 50 meters are combined in the field of geophysics under the name "electromagnetic induction systems" (abbreviated to EMI systems).

An EMI instrument typically contains a transmitter coil (transmitter) and one or more receiver coils (receivers), which are arranged so as to be at a particular mutual spacing. By exciting the transmitter coil using an alternating current in the frequency range of typically between 100 Hz and 100 kHz, a magnetic field is generated, which will be referred to in the following as the primary field. Owing to the electrical conductivity of the soil, the primary field causes induction currents, which, in turn, cause a magnetic field which is known as the secondary field. In general, the secondary field is a few orders of magnitude smaller than the primary field. The receiver measures both fields together. According to the approximation by McNeill (1980), the ratio between secondary field and primary field is proportional to the apparent electrical soil conductivity (ECa), which is the conductivity of a homogeneous soil.

In order to determine the ratio between secondary signal and primary signal, and thus arrive at the conductivity, the primary signal must be determined. The primary signal denotes the measured signal that is caused by the primary field at the receiver. In connection with the calibration methods set out here, determining the primary signal and all further measurement signals which are not influenced by the soil conductivity but instead, for example, by induction in the sensor housing or in cables, etc., is referred to as calibration. For an ideal calibration measurement, a measurement must be carried out using the complete system structure, for example using measuring slides, cables, etc., under the exact environmental conditions present during the real measurement, such as temperature, humidity, electromagnetic fields, etc., at an infinite distance from other electrically conductive media, such as the soil.

Available EMI systems differ in terms of their approaches to calibration. Common methods are the use of a "reference table" comprising data from comparative measurements in known conditions, as disclosed in US2003184301-A1, CA2424250-A1, U.S. Pat. No. 6,710,599-B2 and CA2424250-C, which are used for interpolating and/or extrapolating calibration values that correspond to the environmental conditions, e.g. the temperature, present during the measurement, or carrying out a "field calibration" in the form of a measurement using the EMI system in two orientations, specifically horizontal co-planar coils (HCP) and vertical co-planer coils (VCP), at the examination location prior to the measurement campaign, as described in U.S. Pat. No. 7,759,941 B2. In the latter case, different spatial distributions of sensitivity are achieved for the different coil orientations. The secondary field of a homogeneous soil can be predicted from the different depth dependence of the sensitivity of the measurement system.

Alongside these two instrument-specific methods, in recent years a third method has been established, which is based on reference data regarding the electrical conductivity of the soil at the observation location and observation time. These data predict EMI data using electromagnetic models, and so the EMI data actually measured can be adapted (calibrated) to modeled data. A set of reference data of this type may, for example, be included in a small part of the field of EMI examination using electrical resistivity tomography (Lavoue, F., J. van der Kruk, J. Rings, F. Andre, D. Moghadas, J. Huisman, S. Lambot, L. Weihermüller, J. van der Borght and H. Hereecken (2010). Electromagnetic induction calibration using apparent electrical conductivity modelling based on electrical resistivity tomography. Near Surf. Geophys. 8(6), 553-561.).

To summarize, calibration is usually carried out under conditions in which the soil conductivity is known, or by two different EMI measurements being carried out using the same measurement system above the same location. In this way, the calibration is determined using suitable physical models.

The use of a reference table is based on reference measurements, which must be carried out sufficiently comprehensively in order for them to contain precise calibration data for all possible environmental conditions of measurement campaigns, such as temperature, soil conductivity, aging processes of the measurement system, etc. Finally, a calibration of this type does not contain corrections for self-constructed measuring slides, GPS modules, etc., which sometimes have to be used together with EMI systems. The methods described for field calibration circumvent the majority of the disadvantages just described since the calibration is carried out under the same conditions as the measurement in the field. However, this calibration can only be used for HCP and VCP arrangements; vertical coil arrangements (PRP) cannot be calibrated in this way. Furthermore, typically no calibration apparatus is used that allows a comprehensive EMI structure to be calibrated as often as it is used for quantitative measurements (e.g. using a measuring slide). In addition, the very different spatial sensitivities of the two arrangements (HCP and VCP) can lead to the measurement of different external interferences, which cause errors in the calibration as a result.

The third method, which is based on reference data regarding electrical conductivity of the soil at the observation location and observation time, requires additional measurement instruments and/or expertise in order to determine the electrical soil conductivity independently of the EMI measurements. This approach is therefore usually labor intensive, expensive and/or requires additional measurement instruments to be brought to the examination area. Additionally, an alternative measurement method introduces the risk of slightly different electromagnetic soil parameters being measured, for example owing to different measurement frequencies, and so the resulting soil model differs from the soil model which can be measured using EMI, and limits the quality of the calibration.

The publication of Sasaki et al. "Resistivity and offset error estimations for the small-loop electromagnetic method" in Geophysics vol. 73 no. 3, pages F91-F95 from 2008 discloses a calibration method in which measurements are made at two heights.

The publication of Minsley et al. "Multielevation calibration of frequency-domain electromagnetic data" in Geophysics vol. 79 no. 5, pages E201-E216 from 2014 discloses a calibration method for measurements at great depths.

SUMMARY

In an embodiment, the present invention provides a method for calibration of electromagnetic induction measurement systems. The method includes transmitting, by at least one transmitter of an electric induction measurement system, a magnetic field as a primary signal so as to trigger a current in the soil which current generates a secondary signal, and recording, by a receiver of the electric induction measurement system, the secondary signal at each of at least two heights of the receiver relative to a soil to be measured so as to create an input vector that is a combination of soil properties and environmental properties that contain the properties of the electric induction measurement system, that contains a dataset of n conductivity values of n layers, and that creates, as a starting value, an initial value vector. The initial value vector includes assumptions and apparent electrical conductivities for m measurement heights that are calculated as an assumption by means of a forward model being constant for all measurement heights. Estimated starting values are iteratively optimized by means of an inversion approach, by the difference between modeled and measured values being minimized.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
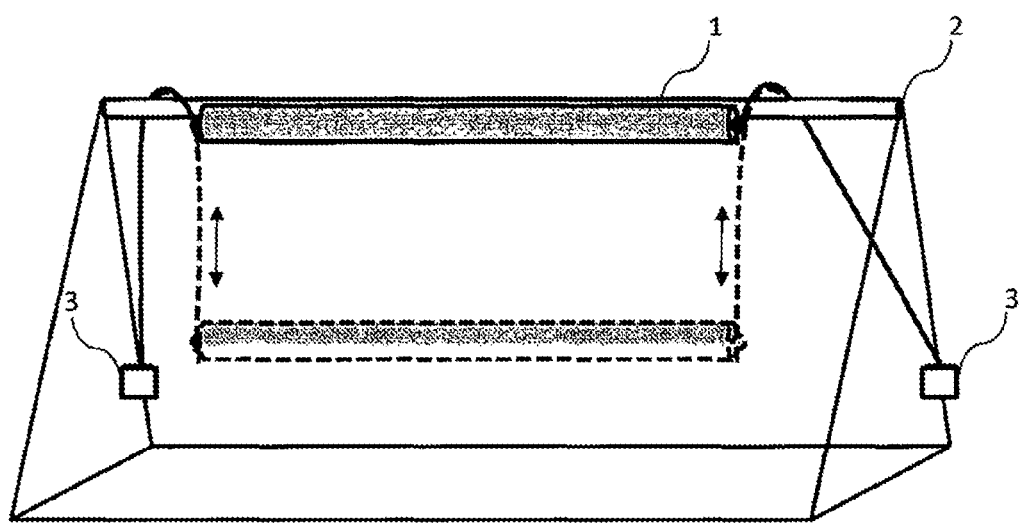
FIG. 1 shows an apparatus according to an embodiment of the invention.
Figure 2:
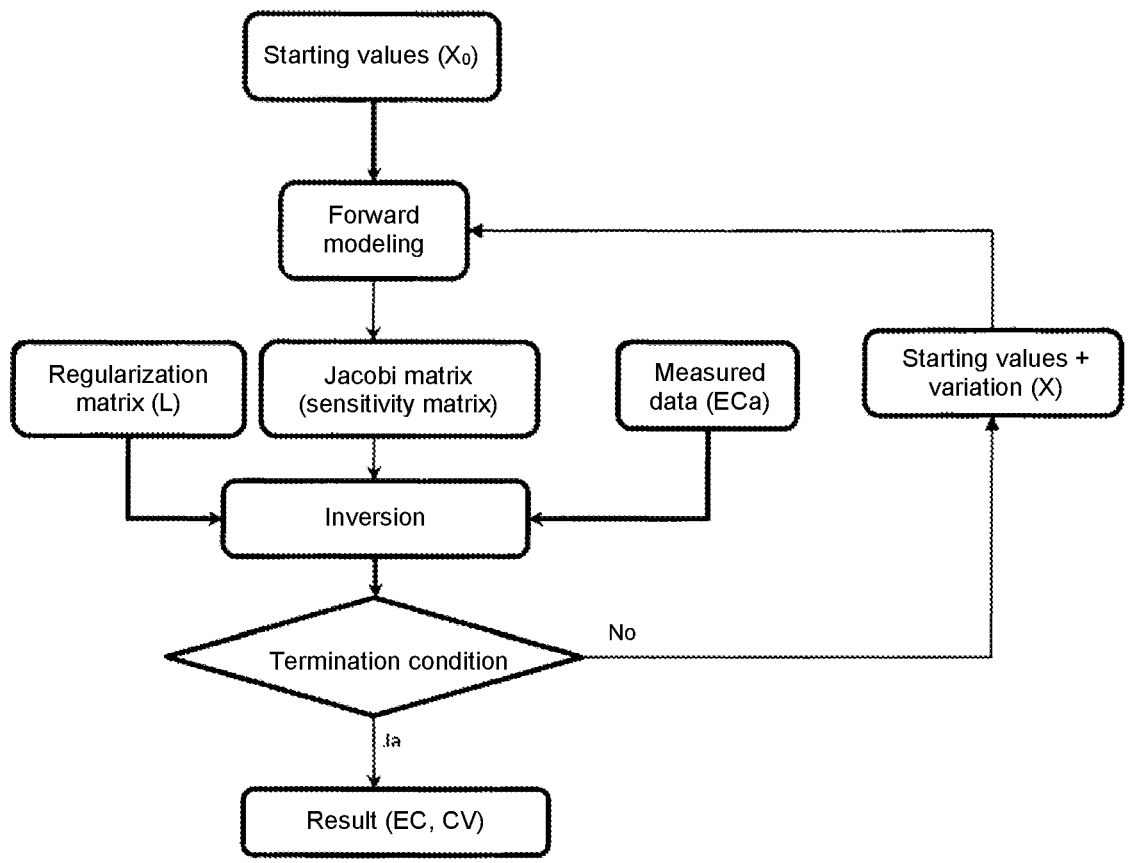
FIG. 2 is a flow diagram for a method according to an embodiment of the invention.

Embodiments of the invention provide calibration methods for electromagnetic induction systems. Such methods are rapid, simple and very precise. The calibration methods according to embodiments of the invention are intended to be suitable for carrying out measurements in which measuring slides or GPS modules are used. All environmental parameters which influence the secondary field are intended to be taken into account during calibration. The calibration is intended to take into account spatial differences in the soil conductivity, for example horizontal soil strata. The methods are intended to be suitable for any EMI instrument and any EMI arrangement. Calibration errors are intended to be prevented or minimized. Calibration of coil arrangements oriented perpendicularly to one another is intended to be made possible. It is intended for selective measurement to be made possible of the magnetic fields which result only from magnetic fields of the soil, which result from the conductivity thereof. Calibration is also intended to made available to PRP coil arrangements. The disadvantages of the prior art are intended to be overcome.

The methods according to embodiments of the invention and the apparatuses according to embodiments of the invention provide for carrying out calibration rapidly, simply and precisely, in particular if there are variable environmental parameters, such as available measuring slides and the use of GPS modules. All environmental parameters which influence the secondary field are taken into account in the process. The calibration takes into account spatial differences in the soil conductivity, such as horizontal soil strata. The method is suitable for any EMI instrument and any EMI arrangement. Calibration errors are prevented or minimized. Calibration of coil arrangements oriented perpendicularly to one another is made possible. Selective measurement is made possible of the magnetic fields which result only from magnetic fields of the soil, which result from the conductivity thereof. Calibration of PRP coils can also be carried out. The disadvantages of the prior art are overcome.

The methods and apparatuses according to embodiments of the invention are suitable for carrying out measurements at depths of up to 50 m. In particular, measurements of the soil conductivity at soil depths of less than 10 m, 5 m and in particular at depths between 0 m and 2 m can be calibrated.

Only a few measurement locations, arranged laterally with respect to one another, are required in order to use the methods according to embodiments of the invention. In particular, in most cases it is sufficient to carry out calibration at only one measurement location. The calibration according to the invention that takes place in this manner allows measurement at adjacent locations.

According to embodiments of the invention, an EMI measurement instrument can be positioned at at least two heights relative to the soil to be measured.

The EMI measurement instrument according to embodiments of the invention, which can also be referred to as induction measurement systems, can be designed in different ways. Said instruments must comprise at least one transmitter and at least one receiver. The transmitter can be a transmitter coil. The receiver can be a receiving coil, a magnetic field sensor or a different means for measuring a magnetic field. In one embodiment, the EMI measurement instrument can have a single receiver. However, the number of transmitter coils and receiving coils, or transmitters and receivers, is not limited. In different embodiments, 2, 3, 4, 5 or more, for example 10, 20 or 30, transmitter coils or transmitters can be provided, according to the requirements or circumstances that are to be taken into account. Similarly, 2, 3, 4, 5, 6, 7, 8 or more receivers, for example up to 250 receiving coils, can be provided. Fundamentally, the number of possible receivers is not limited, but is guided by the requirements of the experimenters or the demands of the experiments.

Here, all possible arrangements of transmitters and receivers can be realized. HCP arrangements, VCP arrangements and even in particular PRP arrangements can thus be used. The transmitters and receivers can also be arranged so as to be rotated relative to one another at any desired angle. This applies to the transmitters and receivers among themselves as well as between transmitters or receivers. Any transmitter/receiver arrangement is conceivable in principle.

When carrying out the methods according to embodiments of the invention, the transmitter(s) emit(s) a magnetic field which triggers a current in the soil, and optionally in the surroundings, which current generates a secondary magnetic field that is measured using the receiver or receivers. According to embodiments of the invention, measured values at different heights with respect to the soil to be measured are recorded by the receiver or by the receivers. In this case, the secondary magnetic fields have to be measured at at least two heights relative to the soil.

A plurality of measured values can be recorded at different heights, for example 2, 3, 4, 5, 20, or any other number of measured values.

The measured values can be recorded at m preferably equidistant heights, for example at spacings of 10 cm, 20 cm, or 30 cm.

For example, it has been shown that, above an overall height of two meters, it is feasible to carry out ten measurements, each at a spacing of 20 cm, or 20 measurements at a spacing of 10 cm.

The measured values lead to values of the measured apparent electrical conductivity of the soil. The apparent conductivity of the soil is the effective value of the conductivity which is measured and which is composed of different conductivities of the soil at different strata depths and on the basis of the spatial sensitivity of the measurement system.

For calibration methods according to embodiments of the invention, an input vector is considered which is composed of a series of electrical conductivities of the soil in different soil regions and, a calibration value per transmitter-receiver pair CV. A transmitter-receiver pair results from any possible combination of transmitters and receivers. For example, one transmitter (Tx1) and two receivers (Rx1, Rx2) results in two transmitter-receiver pairs (Tx1-Rx1 and Tx1-Rx2). In the case of n transmitters and m receivers, the possible number of transmitter-receiver pairs is equal to the product of n and m. The first input vector is a vector based on empirical values and is included in the calculation as an assumption. For a soil arranged in approximately horizontal layers, the input vector X contains an input data set that contains a combination of soil properties and system properties. Therefore, the calibration according to the invention can also be used for more complex soils, for example having two-dimensional or three-dimensional conductivity distribution, and the precision of the calibration can be increased. In the case of a horizontally layered soil and a single receiver, the input vector X contains a dataset of n conductivity values of n layers of the soil to be measured and of a calibration value.

$$X = \begin{pmatrix} EC_1 \\ EC_2 \\ \vdots \\ EC_n \\ CV_1 \end{pmatrix} \quad \text{(Formula 1)}$$

Where $EC_{1-n}$=conductivity value of the relevant layer and $CV_1$=calibration value according to the invention of the transmitter-receiver pair.

When there is a plurality of transmitter-receiver combinations (p), i.e. of at least two receivers or at least two transmitters, in the case of a horizontally layered soil the input vector contains a dataset of n conductivity values of n layers of the soil to be measured and at least two calibration values, the number of calibration values being equal to the number of transmitter-receiver pairs.

$$X = \begin{pmatrix} EC_1 \\ EC_2 \\ \vdots \\ EC_n \\ CV_1 \\ CV_2 \\ \vdots \\ CV_p \end{pmatrix} \quad \text{(Formula 1a)}$$

Where $EC_{1-n}$=conductivity value of the relevant layer and $CV_{1-p}$=calibration value of the relevant transmitter-receiver pair.

In the case of a three-dimensional soil conductivity distribution, a method can be applied in the same way.

An input vector $X_0$ is used as the starting value and is composed of the electrical conductivities $EC_{0,1}$, $EC_{0,2}$, $EC_{0,3}$, ... $EC_{0,n}$ for n layers and a calibration value $CV_{0,1}$.

$$X_0 = \begin{pmatrix} EC_{0,1} \\ EC_{0,2} \\ \vdots \\ EC_{0,n} \\ CV_{0,1} \end{pmatrix} \quad \text{(Formula 2)}$$

When there is a plurality of transmitter-receiver combinations (p), i.e. of at least two receivers or at least two transmitters, in the case of a horizontally layered soil the starting value contains a dataset of n conductivity values of n layers of the soil to be measured and at least two calibration values, the number of calibration values being equal to the number of transmitter-receiver pairs.

An input vector $X_0$ is used as the starting value for a plurality of transmitter-receiver combinations (p) and is composed of the electrical conductivities $EC_{0,1}$, $EC_{0,2}$, $EC_{0,3}$, ... $EC_{0,n}$ for n layers and the calibration value $CV_{0,1-p}$.

$$X_0 = \begin{pmatrix} EC_{0,1} \\ EC_{0,2} \\ \vdots \\ EC_{0,n} \\ CV_{0,1} \\ CV_{0,2} \\ \vdots \\ CV_{0,p} \end{pmatrix} \quad \text{(Formula 2a)}$$

Here, $X_0$ is the output value by means of which the calibration values are intended to be determined. The starting values $EC_{0,1}$, $EC_{0,2}$, ... $EC_{0,n}$, $CV_{0,1}$, $CV_{0,2}$ ... $CV_{0,p}$ are assumptions. Fixed starting values, such as 0.01 S/m for all $EC_{01-n}$ values and 0.005 S/m for all $CV_{0,1-P}$ values, are possible.

Here, the thickness of the individual layers is predefined. For example, up to a depth of 7 meters, the soil is divided into n layers having the same thickness or the layer thickness is increased as the depth increases.

The apparent electrical conductivities ECa(h) of different measurement heights h are calculated for m measurement heights $[h_1, h_2, h_3 \ldots h_m]$ by means of a forward model. Here, the calibration value CV is constant for all heights.

Therefore, for the forward model, for a system having a transmitter-receiver pair at the measurement height h $$f(X_0,h)=ECa_{0,mod}(EC_{0,1} \ldots EC_{0,n},h)+CV_{0,1} \quad \text{(Formula 3)}$$

results as an output value according to formula (3). The subscript mod means that the ECa data are modeled.

Therefore, for the forward model, for a system having a plurality of transmitter-receiver pairs (p), i.e. at least two transmitter-receiver pairs, results $$f(X_0, h) = \begin{pmatrix} ECa_{0,mod,1}(EC_{0,1} \ldots EC_{0,n}, h) \\ ECa_{0,mod,2}(EC_{0,1} \ldots EC_{0,n}, h) \\ \vdots \\ ECa_{0,mod,p}(EC_{0,1} \ldots EC_{0,n}, h) \end{pmatrix} + \begin{pmatrix} CV_{0,1} \\ CV_{0,2} \\ \vdots \\ CV_{0,p} \end{pmatrix} \quad \text{(Formula 3a)}$$

Any known forward model can be used as the forward model. For example, the LIN model for low induction numbers by McNeill, J. D., 1980 Electroagnetic terrain conductivity measurement at low induction numbers. Tech note TN-6, Geonics Ltd. or the FS model ("full solution"), by Ward and Homann 1988, chapter 3, (Electromagnetic Theory for Geophysical Applications), in: Electromagnetic Methods in Applied Geophysics—Theory, investigations in Geophysics. Society of Exploration Geophysicists, Tulsa, can be used as the one-dimensional forward model. The FS model is particularly suitable since it is precisely the correct consideration of the height of the instrument above the soil that is important for the inversion of the calibration value or the calibration values.

In order to calculate the apparent electrical conductivity, or the primary and secondary magnetic field strengths ($H_p$ and/or $H_s$), forward models can be used which are based on completely solving the electromagnetic equations and are described for example by Ward and Hohmann (1988). A simple approximation for the relationship between the measurement signals and the apparent conductivity of a homogenous soil is (McNeill, 1980):

$$ECa = \frac{4}{\mu_0 \omega p^2} \text{Im}\left(\frac{H_s}{H_p}\right), \quad (4)$$

where $H_p$ denotes the primary magnetic field strength, $H_s$ denotes the secondary magnetic field strength, $\mu_0$ denotes the magnetic vacuum permeability, $\rho$ denotes the transmitter-receiver spacing and $\omega$ denotes the measurement frequency.

According to embodiments of the invention, estimated starting values $X_0$ can be incrementally optimized by an inversion approach, by the difference between modeled values and measured values being minimized. Formula 5 can be used as the formula for the minimization.

$$\min\{f(X,h)-ECa_{mea}(h)\} \quad \text{(Formula 5)}$$

Here, the subscript $_{mea}$ means that ECA data are measured.

In general, in this approach, a measured value f(X,h), modeled for model data ($X_i$) and measurement heights h, is compared with actual measured values. The subscript i indicates the associated number of inversion steps that incrementally led to the model data $X_i$. Owing to the difference between measured and calculated data, suitable algorithms are used to modify the model data for a new calculation ($X_i$+1) and to compare the result with the measured data again. This process is continued until the difference is no longer smaller and/or is fulfilled by termination conditions predefined by the user, such as the number of calculation steps, difference, modification of the difference or similar. Various inversion methods can be used for this purpose. The Gauss-Newton method can be cited by way of example.

Formula 5 is the function to be minimized, in which $ECa_{mea}(h)$ are the measured data of different measurement heights h. The number of measurements required depends on the complexity of the soil. In order to determine n soil conductivities at different depths, at least n measurements must be carried out at different heights. The more that different measurements are carried out, the more reliably the numerical method. The at least two measurements correlate with the number of unknowns in the input vector X and the information content of the measurements. In the simplest case of a linear correlation between measurements and unknowns, exactly as many measurements are required as there are unknowns. For a homogeneous soil this would be an EC and additionally a CV.

In the method according to the invention, the use of a plurality (p) of transmitter-receiver combinations means broadening CV to $CV_1, CV_2, \ldots CV_P$ calibration constants. Simultaneous calibration of a plurality of transmitter-receiver pairs simplifies the numerical calculation since one calibration value and one measurement are added per pair and measurement height; however, the number of soil properties EC to be determined remains the same.

Advantageously, a regularization matrix L is inserted into this objective function, which matrix is contained in formula 6.

$$\min\{\|f(X,h)-ECa_{mea}(h)\|_2+\|L \cdot x\|_2\} \quad \text{(Formula 6)}$$

If the equation system according to formula 5 is ill-conditioned, which is often the case, then in the Gauss-Newton method, a regularization (L), as described in formula 6 by way of example, is required in order to solve the equation.

Additional strategies that can be used for solving formula 5 are, for example, the simplex method or stochastic methods such as shuffled complex evolution (SCE).

The apparent conductivities calculated by the forward model for the model data (input vector X) are compared with the measured apparent conductivities by means of an inversion and are optimized in at least one iteration step. In addition, the model data are varied and at least one additional calculation is carried out by a forward model. By comparing the modeled ECa values with the measured ECa values again, it is assessed whether the modified model data X describe the measured values better and whether further inversion steps are carried out. The input vector results according to formula 1 having the values $EC_1$, $EC_2$, $EC_3, \ldots EC_n$, $CV_1$. Here, different inversion methods can also be used.

In different iteration steps, both different forward models and different inversion methods can be used.

After a plurality of iteration steps, for example 500, 1000, 5000 or 10,000, the objective function reaches a minimum and the associated input values X describe the soil model that best fits the measurement data and the calibration for the EMI instrument used. The number of iteration steps (i) depends on the complexity of the problem and the calculation time linked thereto. For complex models, a smaller value of, for example, 20 can be more practicable.

Methods according to embodiments of the invention can be performed by apparatuses according to embodiments of the invention. In addition, an EMI measurement instrument, which has at least one transmitter and at least one receiver, is mounted on a stand which has means in the form of lifting and/or lowering means for adjusting the height of the EMI measurement instrument.

FIG. 1 shows an apparatus according to an embodiment of the invention suitable for carrying out a method. Said apparatus contains an EMI measurement instrument 1 which is mounted on a stand 2 that comprises a height-adjusting means 3, by means of which the height of the EMI measurement instrument relative to the soil can be adjusted.

Methods according to embodiments of the invention involve calibration of electromagnetic induction measurement instruments (EMI instruments) with regard to quantitative apparent measurements of conductivity using EMI measurements at many different measurement heights above the soil. The calibration is numerically calculated on the basis of measurement data in conjunction with an electromagnetic model of the induction processes in the soil.

More or less, the spatial sensitivity distribution of the measurement instrument does not change for different measurement heights; instead, it is constant relative to the measurement instrument. As a result, the sensitivity for particular spatial regions of the soil changes during the calibration measurements at different heights. A simplified soil model can be determined from these different measurement signals for the same soil on the basis of electromagnetic models in conjunction with an inversion algorithm (Hendrickx, J. M. H. B. Borchers, D. L. Corwin, S. M. Lesch, A. C. Hilgendorf, and J. Schlue (2002). Inversion of soil conductivity profiles from electromagnetic induction measurements: Theory and experimental verification. Soil Sci. Soc. Am. J. 66(3), 673-685.). In addition to the conductivities of the soil, a systematic difference in conductivity of the measurement system can also be established and corrected (calibration). This systematic correction also contains all the interferences caused for example by the measurement structure and the measurement system, provided these sources of interference are fixed during the calibration and the measurement relative to the measurement system. In order to integrate the environmental conditions into the calibration as well as possible, the calibration should be carried out at least once immediately before or after the measurement. In order to carry out the calibration, measurements are carried out at different measurement heights using all EMI arrangements (transmitter-receiver combinations). The calibration is calculated for each arrangement using an inversion algorithm. The correction is applied to the EMI data within the context of digital data processing.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for calibration of an electromagnetic induction measurement system, the method comprising:
transmitting, by at least one transmitter of an electric induction measurement system, a magnetic field as a primary signal so as to trigger a current in the soil which current generates a secondary signal, and
recording, by a receiver of the electric induction measurement system, the secondary signal at each of at least two heights of the receiver relative to a soil to be measured so as to create an input vector $$X = \begin{pmatrix} EC_1 \\ EC_2 \\ \vdots \\ EC_n \\ CV_1 \end{pmatrix} \quad \text{(Formel 1)}$$

that is a combination of soil properties and environmental properties that contain the properties of the electric induction measurement system, that contains a dataset of n conductivity values of n layers, and that creates, as a starting value, an initial value vector X0

$$X_0 = \begin{pmatrix} EC_{0,1} \\ EC_{0,2} \\ \vdots \\ EC_{0,n} \\ CV_{0,1} \end{pmatrix} \quad \text{(Formel 2)}$$

wherein $EC_{0,1}$, $EC_{0,2}$, $EC_{0,3}$, ... $EC_{0,n}$ and $CV_{0,1}$ are assumptions and apparent electrical conductivities $ECa_{mod}$ (h) for measurement heights h [$h_1$, $h_2$, $h_3$, ... $h_m$] that are calculated as an assumption by means of a forward model, $CV_{0,1}$ being constant for all measurement heights, to provide, according to a forward model, modeled values f ($X_0$, h)=$ECa_{0,mod}$ ($EC_{0,1}$ ... $EC_{0,n}$, h)+$CV_{0,1}$; and
comparing the modeled values with measured values and iteratively optimizing, by an inversion approach, the modeled values so as to minimize a difference between the modeled values and the measured values to calibrate the electric induction measurement system.

2. The method according to claim 1, wherein the electromagnetic induction measurement system includes a plurality of transmitter-receiver pairs (p), wherein the input vector has the form:

$$X = \begin{pmatrix} EC_1 \\ EC_2 \\ \vdots \\ EC_n \\ CV_1 \\ CV_2 \\ \vdots \\ CV_p \end{pmatrix}$$

and the forward model has the form:

$$f(X_0, h) = \begin{pmatrix} ECa_{0,mod,1}(EC_{0,1} \ldots EC_{0,n}, h) \\ ECa_{0,mod,2}(EC_{0,1} \ldots EC_{0,n}, h) \\ \vdots \\ ECa_{0,mod,p}(EC_{0,1} \ldots EC_{0,n}, h) \end{pmatrix} + \begin{pmatrix} CV_{0,1} \\ CV_{0,2} \\ \vdots \\ CV_{0,p} \end{pmatrix}.$$

3. The method according to claim 1, wherein the forward model is based on completely solving an electromagnetic equation.

4. The method according to claim 1, wherein a LIN model or a FS model is used as the forward model.

5. The method according to claim 4, wherein an approximation is carried out according to:

$$ECa = \frac{4}{\mu_0 \omega \rho^2} \mathrm{Im}\left(\frac{H_s}{H_p}\right)$$

wherein ECa describes apparent electrical soil conductivities, which is a conductivity of a homogeneous soil, $H_P$ is a primary magnetic field strength, $H_s$ is a secondary magnetic field strength, $\mu_0$ is a magnetic vacuum permeability, $\rho$ is a Tx-Rx spacing, and $\omega$ is a measurement frequency.

6. The method according to claim 1, wherein an inversion method for minimization according to $\min\{f(X,h)-ECa_{mea}(h)\}$ is used.

7. The method according to claim 6, wherein a Gauss-Newton inversion method is used.

8. The method according to claim 7, wherein a minimization is carried out according to $\min\{\|f(X,h)-ECa_{mea}(h)\|_2+\|L \cdot x\|_2\}$ wherein h is a height from the soil, X is the input vector, $ECa_{mea}$ is the measured apparent electrical conductivities, and L is a regularizing matrix.

9. The method according to claim 1, wherein from 2 to 20 measured values are measured at different heights.

10. The method according to claim 1, wherein above a height of 2 meters, 10 measurements are carried out at a spacing of 20 cm or 20 measurements are carried out at a spacing of 10 cm.

11. The method according to claim 1, wherein the calibration for measurements of the electrical conductivity is carried out at depths of between 0 m and 50 m.

12. The method according to claim 1, wherein the calibration is carried out at one location or at two locations.

13. An apparatus, comprising:
an EMI measurement instrument mounted on a stand having a lift configured to adjust a height of the EMI measurement instrument, the EMI measurement instrument including:
at least one transmitter coil configured to transmit a magnetic field as a primary signal so as to trigger a current in a soil which current generates a secondary signal, and
at least one receiver coil configured to record the secondary signal at each of at least two heights relative to the soil so as to create an input vector $$X = \begin{pmatrix} EC_1 \\ EC_2 \\ \vdots \\ EC_n \\ CV_1 \end{pmatrix} \quad \text{(Formel 1)}$$

that is a combination of soil properties and environmental properties that contain the properties of the electric induction measurement system, that contains a dataset of n conductivity values of n layers, and that creates, as a starting value, an initial value vector X0

$$X_0 = \begin{pmatrix} EC_{0,1} \\ EC_{0,2} \\ \vdots \\ EC_{0,n} \\ CV_{0,1} \end{pmatrix} \quad \text{(Formel 2)}$$

wherein $EC_{0,1}$, $EC_{0,2}$, $EC_{0,3}$, ... and $CV_{0,1}$ are assumptions and apparent electrical conductivities $ECa_{mod}(h)$ form measurement heights h $[h_1, h_2, h_3, \ldots h_m]$ that are calculated as an assumption by means of a forward model, $CV_{0,1}$ being constant for all measurement heights, to provide, according to a forward model, modeled values $f(X_0, h)=ECa_{0,mod}(EC_{0,1} \ldots EC_{0,n}, h)+CV_{0,1}$, wherein the EMI measurement instrument is configured to compare the modeled values with measured values and iteratively optimize, by an inversion approach, the modeled values so as to minimize a difference between the modeled values and the measured values to calibrate the EMI measurement instrument.

* * * * *